(12) United States Patent
Conrad et al.

(10) Patent No.: US 7,841,242 B2
(45) Date of Patent: Nov. 30, 2010

(54) DEFLECTABLE MICROMECHANICAL SYSTEM AND USE THEREOF

(75) Inventors: Holger Conrad, Dresden (DE); Thomas Klose, Dresden (DE); Thilo Sandner, Dresden (DE)

(73) Assignee: Fraunhofer-Gesellschaft zur Foderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 12/162,404

(22) PCT Filed: Feb. 3, 2006

(86) PCT No.: PCT/DE2006/000243
§ 371 (c)(1),
(2), (4) Date: Sep. 17, 2008

(87) PCT Pub. No.: WO2007/087767
PCT Pub. Date: Aug. 9, 2007

(65) Prior Publication Data
US 2009/0293632 A1 Dec. 3, 2009

(51) Int. Cl.
*G01B 7/16* (2006.01)
(52) U.S. Cl. .......................... 73/777; 73/760
(58) Field of Classification Search ............ 73/760–777
See application file for complete search history.

(56) References Cited

U.S. PATENT DOCUMENTS

| | | | |
|---|---|---|---|
| 3,123,788 A | 3/1964 | Pfann et al. | |
| 4,442,717 A | 4/1984 | Kurtz et al. | |
| 5,034,645 A * | 7/1991 | Woodruff et al. | 310/316.01 |
| 6,046,884 A * | 4/2000 | Crane | 360/244.2 |
| 6,331,923 B1 * | 12/2001 | Mei | 360/294.4 |
| 6,456,464 B1 * | 9/2002 | Khan et al. | 360/294.6 |
| 6,680,826 B2 * | 1/2004 | Shiraishi et al. | 360/294.4 |
| 6,807,875 B2 * | 10/2004 | Lebrun et al. | 73/865.9 |
| 2005/0188769 A1 | 9/2005 | Moelkner et al. | |

FOREIGN PATENT DOCUMENTS

EP 0793082 9/1997

OTHER PUBLICATIONS

Tortonese et al., "Atomic Force Microscopy Using a Piezoresistive Cantilever," Proc. Intl Conf. Solid State Sensors and Actuators (Jun. 24, 1991).

* cited by examiner

*Primary Examiner*—Max Noori
(74) *Attorney, Agent, or Firm*—Nutter McClennen & Fish LLP

(57) ABSTRACT

The invention relates to deflectable micromechanical systems as well as their use in which the deflection of at least one deflectable element can be determined. In accordance with the invention, a deflectable element is held with at least one spring element and at least one unit detecting the deflection is present. It is formed as a piezoresistive sensor with contacts arranged at least at a spacing from one another and in a region deforming on deflection. The contacts are connected to an electrical voltage source. An inhomogeneous electrical field is formed perpendicular to the contact surfaces in the depth direction so that the electrical resistance between contacts varying in dependence on the deflection can be detected as a measure for the position. The deforming region is formed from electrically conductive or semiconductive material.

13 Claims, 6 Drawing Sheets

DEFLECTABLE MICROMECHANICAL SYSTEM AND USE THEREOF

The invention relates to deflectable micromechanical systems in which the respective deflection of at least one deflectable element can be determined. This can be determined with a translatory deflection and/or a rotary deflection around at least one axis of such elements. The respective positional coordinates of a deflectable element or also respective deflection angles can thus be determined. Further measurement values can be determined with the values which can be determined in this manner or a system and in particular the deflection of elements can be actively influenced. Deflectable elements can be, for example, optical elements, in particular reflective elements, but also elastically deformable elements, in particular membranes.

The deflection can be oscillating and can also be carried out while observing resonance conditions. These conditions can be observed better in operation with the invention in the last named case.

Physical active principles have previously been used for a determination of positions in microsystems technology. This is essentially a case of three such principles.

A change in the electrical capacity is thus detected by geometrical changes and the fact is utilized in this connection that the electrical capacity can be influenced by the respective arrangement of electrodes to one another. On a movement of such a system or of elements thereof, the varying electrical capacity of a capacitor arrangement is a correspondingly suitable measure. Such solutions are used in pressure sensors, for zero point detection and also with microscanner mirrors.

A further known possibility is also the use of the pseudo-Hall effect. The piezoresistive properties of monocrystalline silicon are used in this connection. They have the result that an electrical field does not run in a straight line in a workpiece subjected to torsion. An electrical voltage dependent on mechanical shear strain can be picked up with a specific arrangement of electrodes (pseudo-Hall sensor). In this connection, the electrical current flow and the sign of the electrical voltage varies in dependence on the direction of shear. Angles of rotation of micromechanical torsion beams can thus be determined.

In addition, the variation in the electrical resistance, a change in geometry or a change in electrical conductivity can be utilized. Piezoresistive properties of materials such as monocrystalline or polycrystalline silicon are used in this connection. They result in a local variation of the electrical conductivity in the direction of a local strain field. The changed electrical conductivity in the direction of the active tensile forces resulting from a tensile strain can thus result in considerable variations in the electrical resistance in dependence on the geometry. This varied electrical resistance can be determined and the determined measured signal can be used, for example, with miniaturized pressure sensors.

Figure 1:
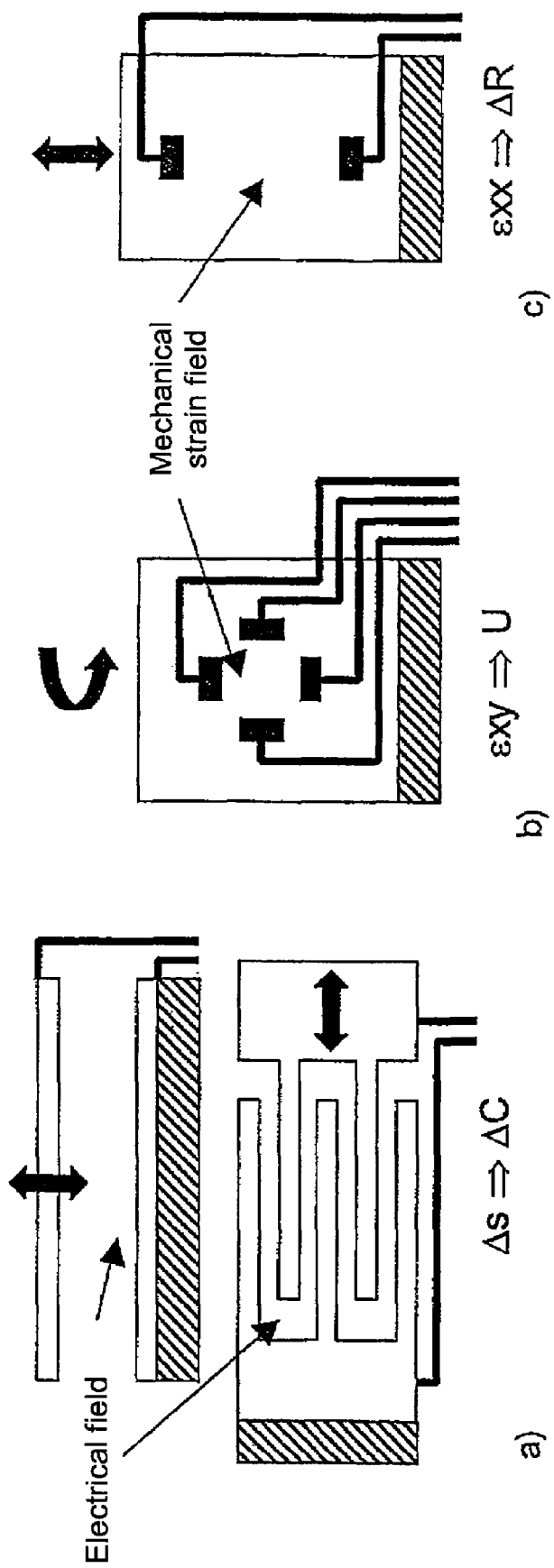

Basically, such possible structures are shown in FIGS. 1 a) to c).

These previously used active principles, however, also have disadvantages. A capacitive sensor is thus not very sensitive and the achievable measuring accuracy is too low for a number of applications. Small capacitive changes are also problematic, in particular when work is carried out with electrostatic drives since it acts as a disturbance variable. In addition, relatively large space requirements are needed for a capacitive sensor, which is extremely counterproductive in microsystems engineering.

It is disadvantageous with pseudo-Hall sensors that a high integration effort has to be taken into account since four separate electrical potentials have to be guided to each sensor element. Correspondingly high space requirements have to be taken into account due to the required four electrodes.

On the determination of correspondingly varying electrical conductivities, a high geometrical dependency at the deformation body must be taken into account.

However, the effect of tensile forces and of compressive forces can be determined relatively easily. This is illustrated schematically by FIGS. 2a) and b). However, the respective direction of movement or of deflection cannot be recognized on bending/deformation with a conventionally used symmetrical design.

Figure 3:
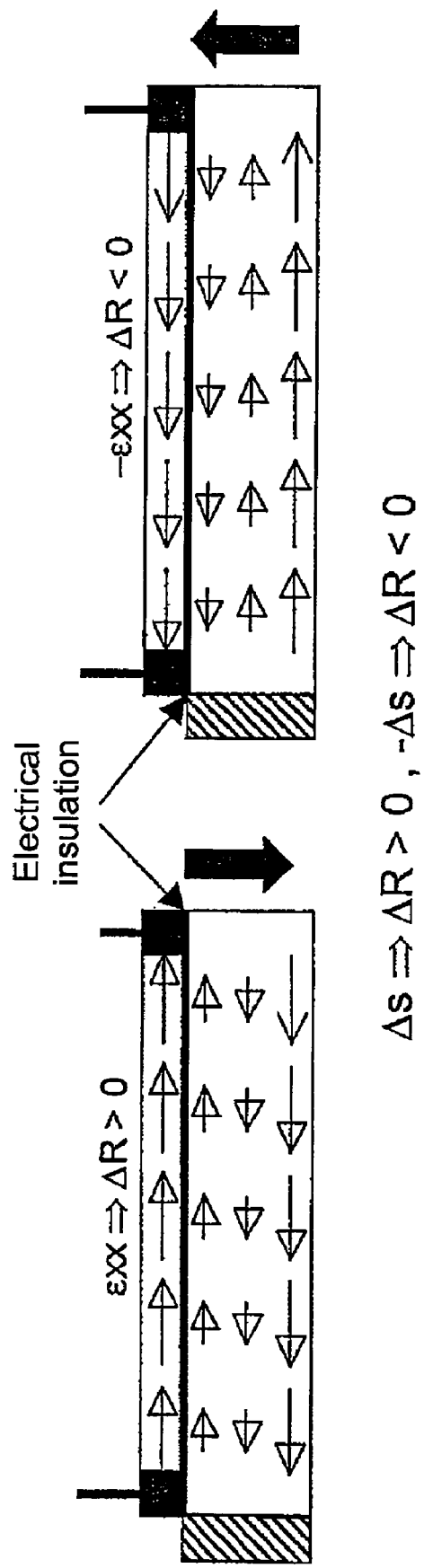

For this reason, for example, an electrically insulating layer has been formed in a layer structure as should be illustrated by FIGS. 3 a) and 3 b).

In this connection, however, the mechanical properties should not be influenced, which can only be achieved with a very great effort or only with limitations. The production effort additionally increases considerably.

It is therefore the object of the invention to be able to determine the position or the deflection of elements precisely, with a low effort and with low space requirements, also with a respective direction of movement, in deflectable micromechanical systems.

In accordance with the invention, this object is solved by a system having the features of claim 1. Uses of a system in accordance with the invention are described in claims 11 to 13.

Advantageous aspects and further developments of the invention can be achieved using the features designated in the subordinate claims.

Inhomogeneous electrical fields can be compelled which interact in an electrically active volume of the system having the mechanical voltage/strain fields due to the piezoresistive effect. A significant variation in the resistance can be achieved and a higher sensitivity can in particular be realized in the deflection direction due to this inhomogeneity of the electrical field irrespective of the existing development of mechanical voltage/strain fields.

This is also the case with a very asymmetrical voltage/strain field formation with systems or zones strained by bending.

The asymmetry of electrical fields can be utilized with the invention by a suitable arrangement of contacts in an otherwise symmetrically formed region of a system. For this purpose, a piezoresistive sensor is formed using contacts which are connected to an electrical voltage source and which are arranged at a spacing which is as small as possible, said piezoresistive sensor being arranged in a system in accordance with the invention at a region which deforms on a deflection of an element. On deformation, the electrical resistance varies and it can be used as a measure for the respective deflection or position of the deflected element of the system.

The arrangement of electrical contacts should take place such that a formation of inhomogeneous electrical fields occurs in the depth direction, i.e. perpendicular to the contact surfaces.

The spacing of the contacts should be kept very small and, where possible, should not exceed 1.5 times the height.

A correspondingly varying electrical field is formed with correspondingly high inhomogeneity within the deformed region since the determined electrical resistance is influenced substantially more by the change in the electrical conductivity on the deformation of the region at its surface at which the contacts are arranged as is the case in the portion of the deformed region arranged below it.

While utilizing this effect, the sensitivity, and in particular also the directional sensitivity, can be increased, which can preferably be utilized with deformations which occur as a result of bending or torsion.

Sensitivity can be achieved completely extending over the total depth of deforming regions. A deforming region should have homogeneous piezoresistive properties and form a piezoresistive transducer in the interaction region with an inhomogeneous electrical field.

In this connection, no delineation of the deforming region (s) of other regions of a system is required, for example by means of electrical insulation layers and/or the change of material properties, in particular piezoresistive properties, the doping and/or electrical conductivity.

The invention can be particularly advantageously further developed if a plurality of contacts of piezoresistive sensors are electrically connected to form a measurement bridge. In this connection, at least two piezoresistive sensors should be arranged such that, on a deflection of an element resulting in the deformation of a region, a measurement signal having an opposite sign of a change in the electrical resistance is obtained. Since, however, symmetrical elements or arrangements are frequently used in microsystems engineering, such a solution can be used as a rule without an increased effort having to be exerted.

With the invention, the deformable region at which a piezoresistive sensor is present should be formed from an electrically conductive material, preferably a semiconductive material, in particular a monocrystalline or polycrystalline semiconductor. The latter can, for example, be silicon, preferably low-doped or non-doped silicon, which is frequently used for the manufacture of micromechanical elements or also systems. However, germanium, indium gallium arsenide or indium tin can also be used.

Deflectable elements used at micromechanical systems are usually held by means of a suspension and spring elements such as spiral springs and/or torsion springs are elements of such a suspension in this connection. The contacts of piezoresistive sensors should be arranged at, but at least in the vicinity of, such spring elements since a region deforming on a deflection is present there.

The contacts can be formed directly on the surface of a deforming region and can be connected to it in a firmly bonded manner. They can be formed in thin film technology.

In an embodiment of the invention in which a plurality of piezoresistive sensors are electrically connected to one another to form a measurement bridge, they should be arranged such that they each deliver a measurement signal for a detected electrical change in resistance with an opposite sign on a deflection in one direction. This is possible as a rule due to the symmetrical design usually used in microsystems engineering.

Only low space requirements are needed for one or also more piezoresistive sensors at a micromechanical system in accordance with the invention. Only one electrical feed line has to be guided to each contact.

A detection of the direction of bending or torsion occurring on the deflection of an element is also possible with symmetrical geometries at a micromechanical system.

A higher measurement sensitivity can be achieved with respect to the known solutions.

The production effort is, in contrast, low in comparison with the previously used solutions.

This can be achieved by the inhomogeneous design of electrical fields, in particular in the active region with a corresponding depth extension in deformable regions. The body can thus have homogeneous piezoresistive properties over the total volume, which can be achieved by the arrangement of the electrical contacts. In contrast to the known solutions, production steps which were required for a coating or final doping and structuring can be dispensed with and the manufacturing effort can consequently be reduced.

All these advantages, however, compensate the higher effort which is required for the evaluation of the measurement signals, which is in particular due to the non-linearity of the detected measurement signals.

As already mentioned above, the invention can also be used in systems operated while observing resonance conditions, with the influence on their observation of the resonance being able to be improved by the invention.

In particular with a connected measurement bridge of a plurality of piezoresistive sensors with which inhomogeneous electrical fields can be formed, interfering influences such as temperature drift and non-linearities can be suppressed or even prevented in addition to the increased measurement sensitivity.

The invention can be used for the determination of the respective deflection of reflecting elements (tilting mirror, torsion micro-mirror) which are pivoted around one or also two axes. It can, however, also be used in systems with an element deflected in translation (translation oscillator, translation micro-mirror). Angular speed sensors, angular acceleration sensors, rotation rate sensors, force sensors, torque sensors, acceleration sensors or tactile sensors are also specific examples for the use of micromechanical systems in accordance with the invention. Tactile sensors can be used for the determination of surface topographies or for the determination of the roughness of surfaces.

The invention will be explained in more detail by way of example in the following.

Figure 2:
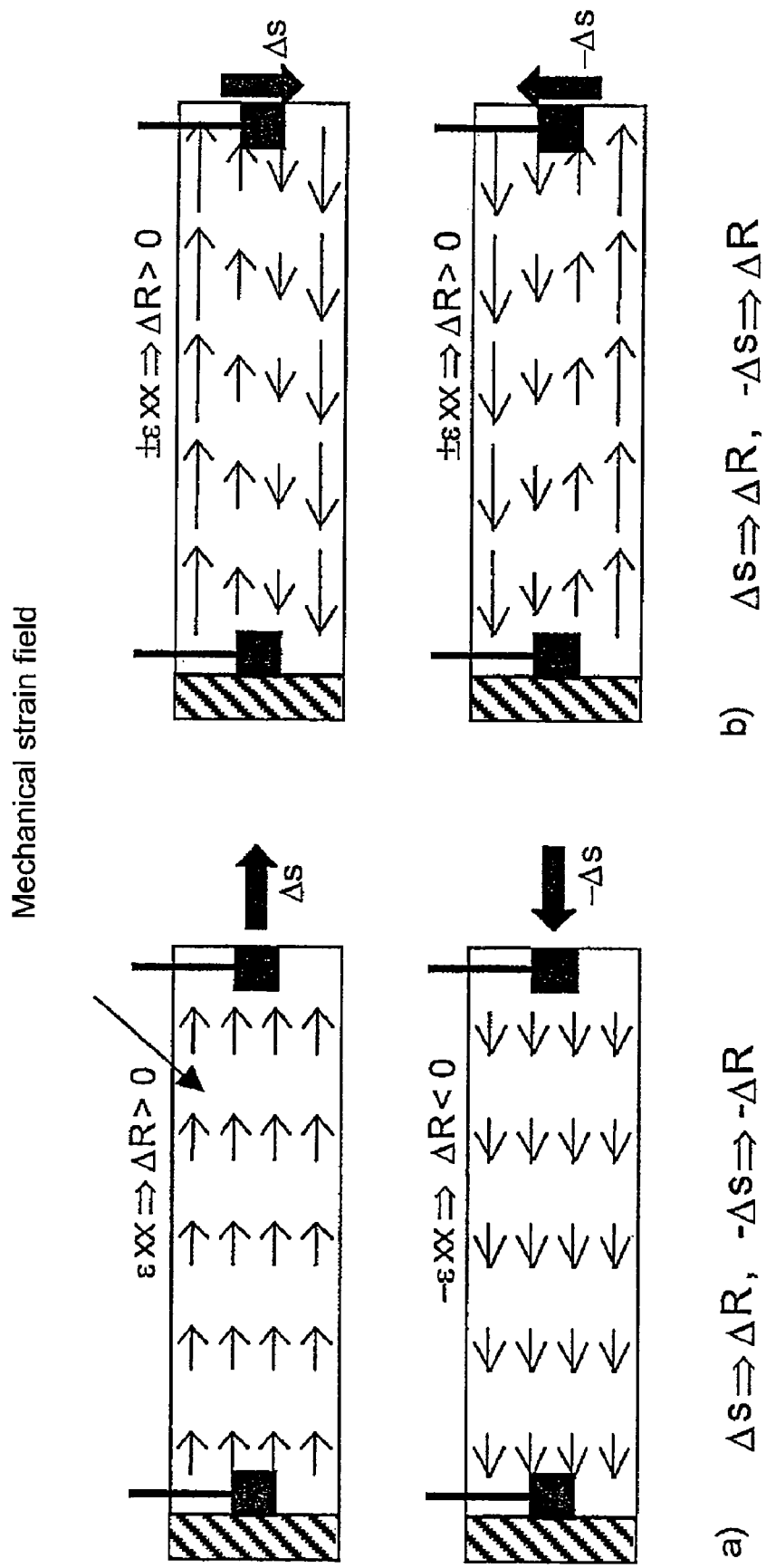
Figure 4:
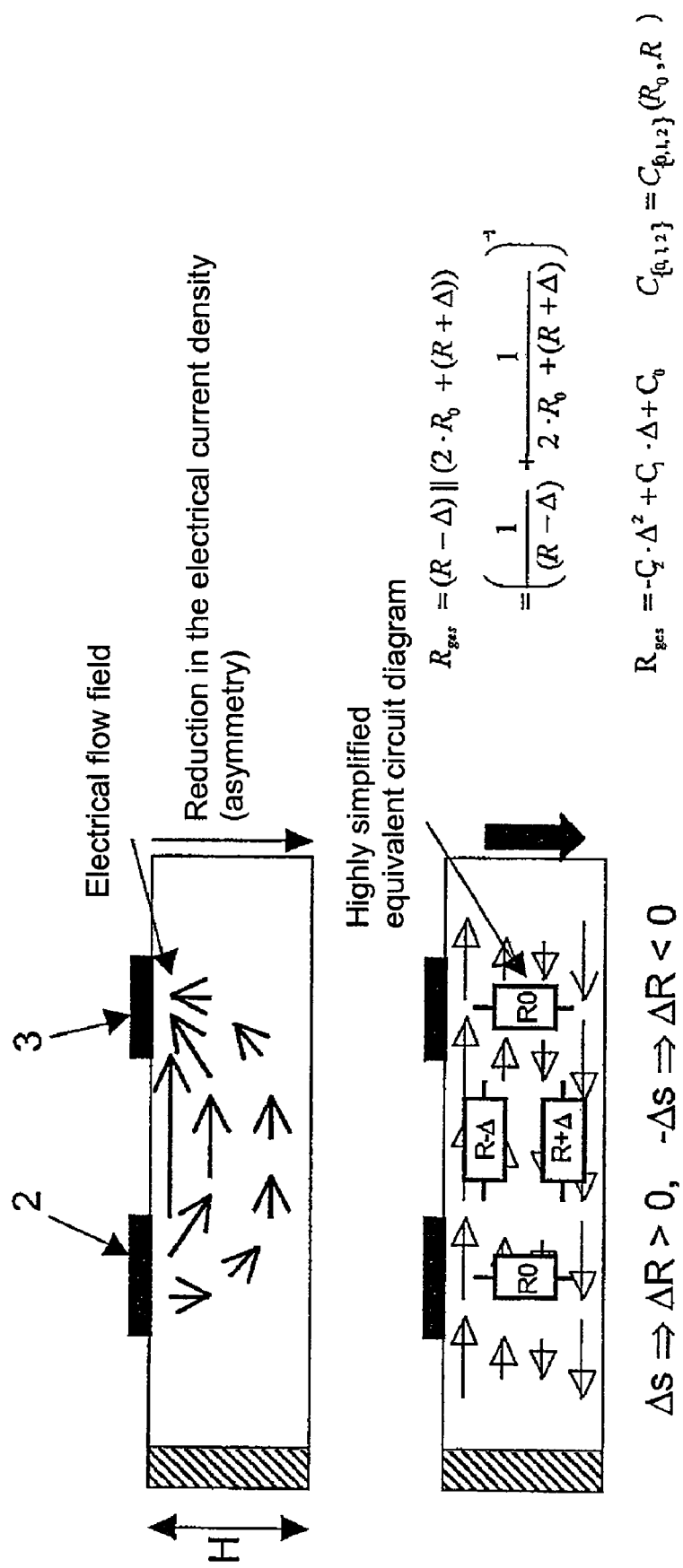
Figure 5:
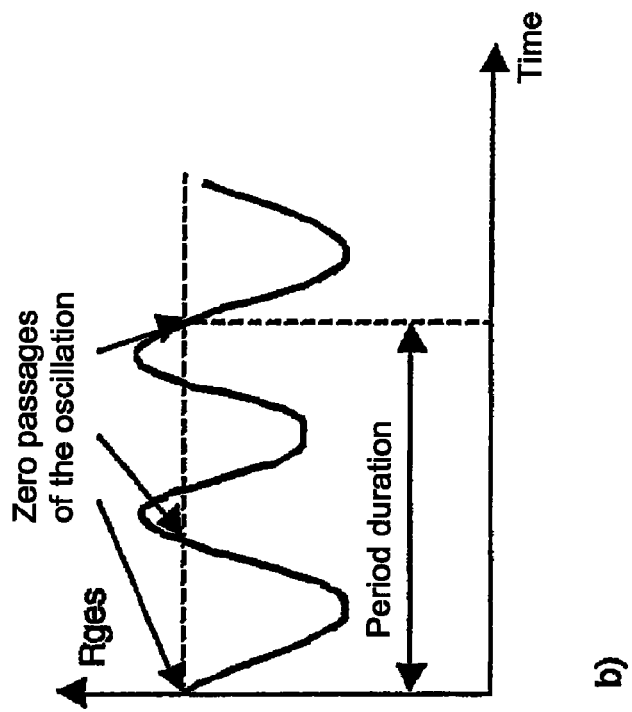
Figure 5:
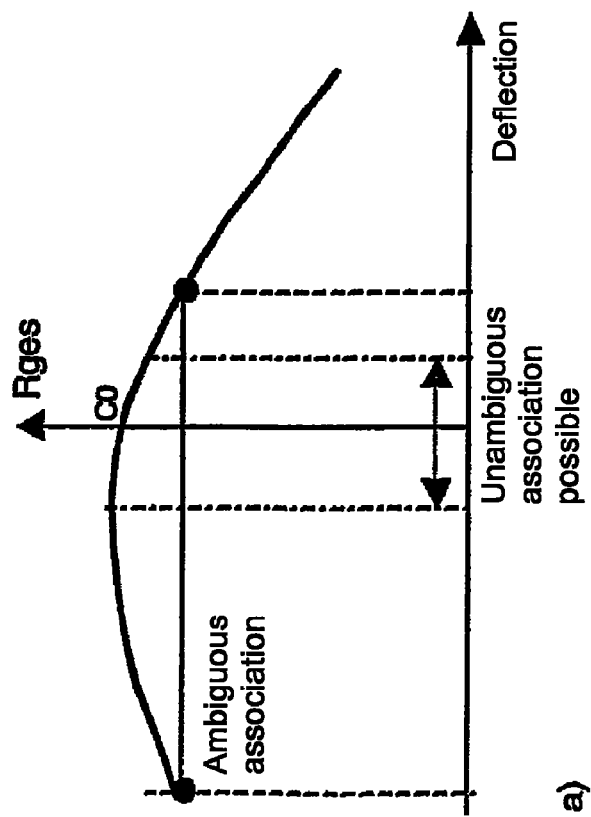
Figure 6:
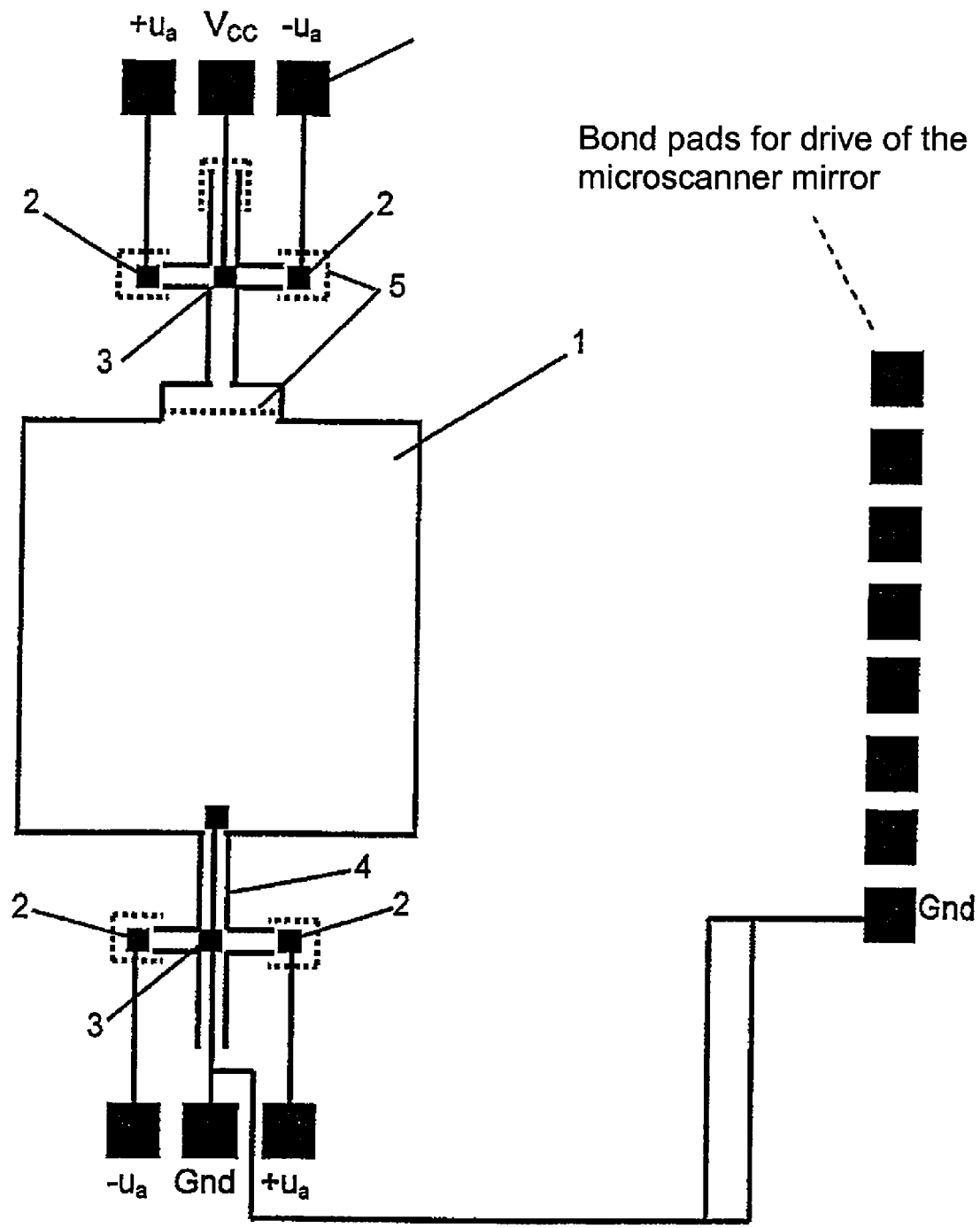

There are shown:

FIG. 1 three examples for known measurement principles used in accordance with the prior art;

FIG. 2, in schematic form, possibilities for piezoresistive electrical resistance change in silicon when acted on by tensile forces and compressive forces as well as on bending;

FIG. 3 a known possibility for the observation of asymmetrical relationships on the piezoresistive electrical resistance change;

FIG. 4, in schematic form, the active principle of a piezoresistive sensor usable at a micromechanical system in accordance with the invention;

FIG. 5 diagrams of the electrical resistance change which can be detected with the invention on deflection of an element; and FIG. 6, in schematic form, possibilities for the formation of a micromechanical system having a deflectable element and a plurality of piezoresistive sensors to be connected to one another.

Three active principles are illustrated in FIG. 1 such as have been named in the introduction to the description. In this respect, FIG. 1 *a*) relates to a capacitive system; FIG. 1 *b*) to a pseudo-Hall sensor and FIG. 1 *c*) to a known piezoresistive sensor.

A detectable piezoresistive resistance change on active tensile forces (shown at the top) and compressive forces (shown at the bottom) should be illustrated by FIG. 2*a*). FIG. 2*b*) should illustrate this for bending strain with a different bending direction.

Analog to FIG. 2*b*), a known possibility for the observation of asymmetrical relationships should be illustrated by FIG. 3, likewise on bending with a different direction. In this connection, the change in the local electrical resistances for the change in the total resistance can be described approximately by a quadratic equation with quadratic, linear and constant portions.

In this connection, the linear portion results in an asymmetry of the electrical resistance varying in dependence on the deflection and deformation, as can be seen from FIG. 5 a). The development of the characteristic delivers an unambiguous statement on the deflection with respect to the respective change in the electrical resistance for a limited region. The width of this region is dependent on the geometry and on the properties of the material (silicon) in the deformable region. With larger deflections, no unambiguous statement can be obtained. It is then not easily possible to determine the position or the respective deflection from an individual measurement value. Unlike with known piezoresistive sensors, the magnitude of the deflection and also the direction of the deflection can then also not easily be clearly determined If, however, as with a microsystem operated while observing resonance conditions, the trajectory of the deflection movement is known (e.g. sinusoidal), a conclusion can be drawn on amplitude, phase position and instantaneous position with a continuous detection of measurement signals. This should be illustrated by the diagram shown in FIG. 5 b).

A further possibility for the detection of the positions on large deflections results from a combination with a further piezoresistive sensor which can clearly detect the respective deflection. The respective position or deflection can be clearly determined by a combination of the path information of this piezoresistive sensor with an inhomogeneous electrical field.

Preferably at least two piezoresistive sensors, which generated inhomogeneous electrical fields, should be connected to form an electrical measurement bridge for a clear determination of positions or deflections.

This is shown schematically in different embodiments by FIG. 6.

In this connection, two torsion spring elements 4 arranged diametrically opposite one another form an integral part of a suspension for an element 1 pivotable around an axis and thus deflectable and are connected thereto. The deflectable element 1 can have a reflective surface and form a mirror.

Contacts 2, 3 are shown at the torsion spring element 4 shown at the top which form the piezoresistive sensors and are connected to an electrical power or voltage source and are connected to form a measurement bridge. The respectively outwardly arranged contacts 2 are connected to an electrical voltage potential with an opposite sign.

The arrangement of the contacts 2 and 3, and accordingly of the two piezoresistive seniors, took place at bending beams 6 which deform on the pivoting of the deflectable element 1, with a deformable region being present there.

In addition, electrical insulations 5 are represented by spots and have been formed, for example, by ditches filled with an electrically insulating material.

In this connection, an electrical insulation 5 is also present at the deflectable element 1 at the torsion spring element 4 shown at the top. In contrast to this, a connection 6 is present at the deflectable element 1 in the torsion spring element 4 shown at the bottom and is connected to ground potential so that in such an embodiment an electrical insulation 5 of the deflectable element 1 can be dispensed with. The region can thus be coupled to piezoresistive sensors from the drive for the deflectable element 1.

In the embodiment shown at the top, the sensors and drive are decoupled.

In any case, the spacings of the contacts 2 and 3 are each smaller than the height H of the deforming regions at the bending beams 6.

The invention claimed is:

1. A deflectable micromechanical system, comprising:
   a deflectable structure, including
      a deflectable element;
      a suspension element comprising at least one spring, the suspension element holding the deflectable element and having a deformation region for imparting deflection to the deflectable element, the deformation region being electrically conductive or semiconductive;
   a detector, the detector being designed as a piezoresistive sensor having first and second contacts, the first and second contacts being spaced apart from one another and being located on the deformation region;
   wherein the first and second contacts are connected to a voltage source to form an inhomogeneous electrical field in a depth direction perpendicular to contact surfaces of the first and second contacts so that the electrical resistance between the first and second contacts varies in dependence on a deflection of the deflectable element can be detected.

2. The system of claim 1, wherein the spacing of the contacts (2, 3) from one another is ≦1.5 times a height H of the deformation region on which the contacts are located.

3. The system of claim 1, wherein the deformation region has homogeneous piezoresistive properties and is arranged in an inhomogeneous electrical field.

4. The system of claim 1, wherein at least two piezoresistive sensors are electrically connected to form a measurement bridge.

5. The system of claim 1, wherein the deformation region is formed from a semiconductive material or piezoresistive material.

6. The system of claim 1, wherein the deformation region is formed from silicon, polysilicon, indium gallium arsenide, indium tin or germanium.

7. The system of claim 1, wherein the deforming region is formed from low-doped or non-doped silicon.

8. The system of claim 1, wherein the deflectable element is connected to ground potential.

9. The system of claim 1, wherein the deflectable element is a mirror.

10. The system of claim 1, wherein the system is a torsion mirror system.

11. The system of claim 1, wherein the system is a translation micro-mirror.

12. The system of claim 1, wherein the system is an indirect detection system for measuring active forces, torques, accelerations, rotation rates, angular speeds or angular accelerations.

13. The system of claim 1, wherein the system is a tactile detection system for measuring the roughness of surfaces or for the determination of a surface topography.

* * * * *